United States Patent Office
3,755,464
Patented Aug. 28, 1973

3,755,464
TERTIARY-ALKYL HALOCUMYL PEROXIDES
Richard Anthony Bafford, Aiken, S.C., assignor to Pennwalt Corporation, Philadelphia, Pa.
No Drawing. Continuation-in-part of application Ser. No. 771,344, Oct. 28, 1968. This application Feb. 25, 1970, Ser. No. 13,792
Int. Cl. C07c 73/08
U.S. Cl. 260—610 R         8 Claims

ABSTRACT OF THE DISCLOSURE

Tertiary-alkyl halocumyl peroxides of the formula

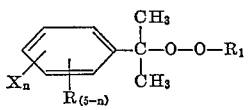

wherein X is F, Cl, or Br; $n=1-5$; R is H, alkyl, cycloalkyl, or aryl; and $R_1$ is tertiary-alkyl of 4–8 carbon atoms. These peroxides are useful for crosslinking polymeric materials without producing an objectionable odor.

---

This application is a continuation-in-part of copending application Ser. No. 771,344 filed Oct. 28, 1968.

This invention relates to novel tertiary-alkyl halocumyl peroxides, and more particularly, it relates to such peroxides which have an improved capability for crosslinking polymers and which do not at the same time produce an objectionable odor of acetophenone.

Many varieties of peroxides are known, including alkyl, cycloalkyl, and aralkyl peroxides. Typical of such compounds are ditertiary-butyl peroxide, isopropyl cyclohexyl peroxide, dicumyl peroxide, and tertiary-butyl cumyl peroxide. These peroxides, as well as others, are well-known for their utility in producing free-radicals which effect the crosslinking of polymers, such as polydiolefins, polyolefins, polyesters, and various copolymers. However, the latter two peroxides inevitably also produced a lingering, objectionable odor of acetophenone in the crosslinked polymer. As a result polymers crosslinked in this fashion were restricted to areas of use where such odors were tolerable, e.g. wire coating for outdoor applications.

It has now been found that if the aryl nucleus of a tertiary-alkyl cumyl peroxide is substituted with one or more halogens two surprising improvements are obtained; namely, (1) there is no objectionable odor when used to crosslink polymers, and (2) the crosslinking efficiency of the halo-substituted peroxide is greater than that of the unsubstituted peroxide.

The halogenation of di-t-butyl peroxide to give halogenated peroxides is well-known (see e.g. U.S. Pat. 2,501,966 and U.S. Pat. 3,169,103) generally producing a mixture of symmetrical and unsymmetrical halo peroxides containing from one to four halogen atoms. Isolation of anyone of these compounds is difficult since, for example, there are three dichloro isomers, five trichloro isomers, and nine tetrachloro isomers. Pure monohalo-di-t-butyl peroxides hav been prepared by the alkylation of the monohalo-t-butyl hydroperoxide with t-butyl alcohol as disclosed in U.S. Pat. 2,501,967. The preparation of bis(p-chlorocumyl) peroxide and bis(3,4-dichlorocumyl) peroxide has been disclosed in British Pat. 961,481; and dibromo-dialkyl peroxides have been disclosed in U.S. Pat. 3,304,332. None of these references, however, discloses or suggests the tertiary-alkyl halocumyl peroxides of this invention nor the advantages achieved by these novel peroxides.

It is an object of this invention to provide novel tertiary-alkyl halocumyl peroxides. It is another object of this invention to provide cumyl peroxides which are efficient crosslinking agents and yet which do not produce any objectionable odor during the crosslinking. Still other objects will become apparent from the detailed description of this invention.

The novel peroxides of this invention are especially useful as crosslinking or curing agents. These peroxides are halogenated derivatives of t-butyl cumyl peroxide, the halogen substituents being attached to aromatic nuclear carbon atoms. These compounds are especially valuable for crosslinking or curing polymers where objectionable odors that are usually associated with peroxide-cured polymers cannot be tolerated. The decomposition by-products of these peroxides leave no objectionable odors in the crosslinked or cured polymer. Moreover these novel peroxides are more efficient as crosslinking agents than unsubstituted t-alkyl cumyl peroxide, although the explanation of this unexpected improved efficiency is not entirely understood. It may be because the peroxides of this invention have higher boiling points than the unsubstituted peroxide and that less peroxide is lost by volatilization during incorporation of the peroxide into the molten polymer by milling or Banburying. However, alkyl-substituted t-butyl cumyl peroxides which are less volatile than the unsubstituted compound are also less efficient than the halocumyl peroxides of this invention. Therefore, the increased efficiency of these novel peroxides cannot be attributed solely to higher boiling points.

The novel compounds of this invention are tertiary-alkyl halocumyl peroxides of the formula:

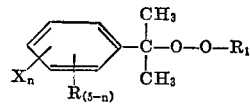

wherein X is fluorine, chlorine, or bromine; R is hydrogen, alkyl, cycloalkyl, or aryl; $R_1$ is a tertiary-alkyl of 4–8 carbon atoms; and $n$ is an integer from 1 to 5. In the preferred embodiments of this invention the aromatic nucleus is substituted 1–3 times with halogen and the remaining substituents are hydrogen or lower alkyl, and the tertiary-alkyl group is tertiary-butyl or tertiary-amyl. Thus, the preferred peroxides have the formula:

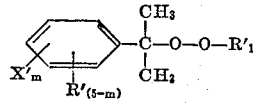

wherein X' is fluorine, chlorine, or bromine; R' is hydrogen or lower alkyl of 1–4 carbon atoms; $R'_1$ is tertiary-butyl or tertiary-amyl; and $m$ is an integer from 1 to 3.

In the foregoing formulae R may be alkyl, cycloalkyl, or aryl. Included among these substituents are methyl, ethyl, propyl, isopropyl, butyl, amyl, hexyl, octyl and decyl, including the primary, secondary, and tertiary forms of these alkyls. The lower alkyls of 1–4 carbon atoms are preferred, i.e. methyl, ethyl, propyl, butyl, isopropyl, sec.-butyl, and tert.-butyl. Included among the cycloalkyls and aryls are cyclobutyl, cyclopentyl, cyclohexyl, and cycloheptyl, phenyl, benzyl, naphthyl, and the like. It is to be understood that any of the foregoing may be further substituted with inert substituents, such as halogen.

$R_1$ is a tertiary-alkyl of 4–8 carbon atoms, which means that the alkyl group has 4–8 carbon atoms, at least one of which is a tertiary carbon atom through which the alkyl group is attached to the peroxide group. Therefore the tertiary-alkyl group may be tertiary-butyl, tertiary-amyl, tertiary-hexyl, tertiary-heptyl, or tertiary-octyl. It is unimportant whether the tertiary carbon atom of the tertiary-alkyl is the only tertiary carbon atom in the molecule or where that tertiary carbon atom is located in the molecule so long as a tertiary carbon atom is attached to the peroxide group. Thus, in addition to 1,1-dimethylbutyl, tertiary-hexyl includes 2-methylpentyl, 3-methylpentyl, and 1,1,2-trimethylpropyl. Tertiary-heptyl includes 1,1-dimethylpentyl, 2-methylhexyl, 3-methylhexyl, 1,1,2-trimethylbutyl, 1,1,3-trimethylbutyl, 1,1,4-trimethylbutyl, 1,1,2,2-tetramethylpropyl, 1,1,3,3-tetramethylpropyl, and 1,1-dimethyl-2-ethylpropyl. Tertiary-octyl includes 1,1,2,3,3-pentamethylpropyl, 1,1,3,3-tetramethylbutyl, 1,1,2,2-tetramethylbutyl, 1,1,2-trimethylpentyl, 1,1,3-trimethylpentyl, 1,1,4-trimethylpentyl, 2,3,4-trimethylpentyl, 1,1-dimethylhexyl, 2,3-dimethylhexyl, 2,4-dimethylhexyl, 2,5-dimethylhexyl, and 3,4-dimethylhexyl, 2-methylheptyl, 3-methylheptyl, 4-methylheptyl, 2,3-diethylbutyl, 2-methyl-3-ethylpentyl, 2-methyl-4-ethylpentyl, 3-ethylhexyl, etc. These tertiary-alkyl groups are preferably hydrocarbons but they may in less preferred embodiments be substituted with inert groups such as halogen.

Among the preferred tertiary-alkyl halocumyl peroxides of this invention are those in Table I which refers to the generic formula above.

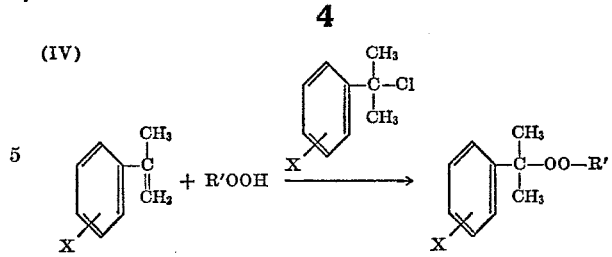

Reactions represented by I, III, and IV are preferred if an isomer-free product is desired.

The tertiary-alkyl halocumyl peroxides of this invention are effective crosslinking (vulcanizing) agents for polymeric materials which are capable of being crosslinked to form a thermoset material. Herein the words of art "crosslinking" and "vulcanizing" are used as synonyms.

According to the present invention there is provided an improved method for the crosslinking of filled or unfilled polymeric materials which method comprises heating said polymeric material, and an amount of tertiary-

TABLE I

| Substituents in formula | | | | |
|---|---|---|---|---|
| R | R₁ | X | n | Name |
| Hydrogen | t-Butyl | Chlorine | 1 | t-Buty 2-chlorocumyl peroxide. |
| Do | do | do | 1 | t-Buty 3-chlorocumyl peroxide. |
| Do | do | do | 1 | t-Butyl 4-chlorocumyl peroxide. |
| Do | t-Amyl | do | 1 | t-Amyl 3-chlorocumyl peroxide. |
| Methyl | t-Butyl | do | 1 | t-Butyl 5-chloro-3-methylcumyl peroxide. |
| Hydrogen | do | do | 2 | t-Butyl 3,4-dichlorocumyl. peroxide. |
| Do | do | do | 3 | t-Butyl 2,3,6-trichlorocumyl peroxide. |
| Do | do | Bromine | 1 | t-Butyl 4-bromocumyl peroxide. |
| Ethyl | do | do | 1 | t-Butyl 4-ethyl-2-bromocumyl peroxide. |
| Isopropyl | do | do | 2 | t-Butyl 4-isopropyl-3,6-dibromocumyl peroxide. |
| Hydrogen | do | Fluorine | 1 | t-Butyl 4- fluorocumyl peroxide. |
| Do | do | do | 1 | t-Butyl 3-fluorocumyl peroxide. |
| Do | do | do | 1 | t-Butyl 2-fluorocumyl peroxide. |
| Isopropyl | t-Amyl | do | 1 | t-Amyl 4-isopropyl-2-fluorocumyl peroxide. |
| Butyl | t-Butyl | Chlorine | 1 | t-Butyl 4-butyl-2-chlorocumyl peroxide. |
| t-Butyl and methyl | do | do | 3 | t-Butyl 4-t-butyl-2-methyl-3,5,6-trichlorocumyl peroxide. |
| Methyl | t-Amyl | Bromine | 2 | t-Amyl 2,4-dimethyl-3-6-dibromocumyl peroxide. |
| Hydrogen | t-Octyl | Chlorine | 1 | 1,1,3,3-tetramethylbutyl 4-chlorocumyl peroxide. |

The compounds of this invention may be prepared by a variety of known chemical reactions such as (I) the acid-catalyzed condensation of the appropriately substituted cumyl alcohol and t-alkyl hydroperoxide; (II) electrophilic halogenation of t-alkyl cumyl peroxide; (III) the transition metal catayzed decomposition of t-alkyl hydroperoxide in the presence of a suitably substituted cumene; and (IV) the process of parent application Ser. No. 771,344 involving the addition of t-alkyl hydroperoxide to a suitably substituted α-methyl-styrene in the presence of a catalytic amount of a similarly substituted cumyl halide.

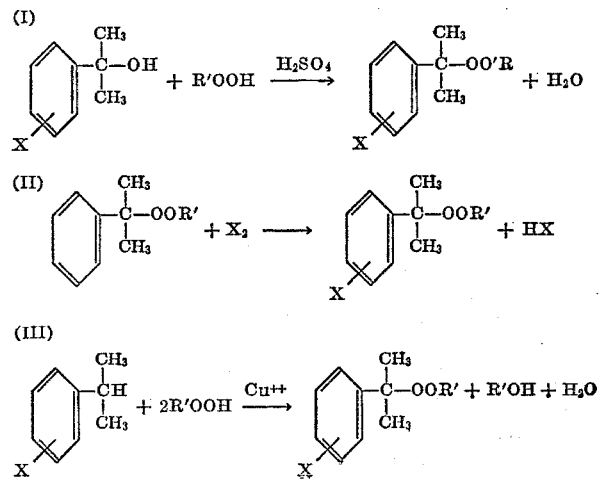

alkyl halocumyl peroxide sufficient to achieve the desired degree of crosslinking. The preferred amount of peroxide is from about 0.004 to about 0.02 equivalents based on the polymeric material to be crosslinked. The improved method essentially eliminates the blooming and/or odor problems associated with the use of prior art aralkyl peroxide crosslinking agents.

These polymeric materials include those natural and synthetic materials which are thermoplastic or have indefinite melting points and which can be transformed to thermoset materials—elastic, or more or less rigid solids—by a crosslinking (curing) reaction, through the action of an added agent.

Illustrative classes of operable polymeric compounds are: The solid polyolefins such as polyethylene; and polybutenes. The elastomers such as natural rubber and the synthetic rubbers including butyl rubber, GR-S rubber, neoprene, acrylic rubber, Buna rubber, ethylene-propylene rubber and the silicone rubbers and miscellaneous "elastomers" such as polybutenestyrene copolymers, and urethane rubber. The polymers may contain plasticizers and/or oil extenders.

An intimate mixture of the defined polymeric material and the tertiary-alkyl halocumyl peroxides of this invention can be stored until needed. The mixture can be heat cured in reasonable times at reasonable temperatures to a crosslinked (vulcanized) material. The temperature and time are controlled, and sufficient agent used to afford the desired degree of crosslinking at these conditions.

In addition to the defined polymeric material and the tertiary-alkyl halocumyl peroxide in intimate mixture, the crosslinkable composition may contain co-agents such as sulfur, promoters, coupling agents, fillers, reinforcing materials, and any other materials conventionally used in the production of a crosslinked composition. Desirable fillers are carbon blacks, titanium dioxide, calcium silicate, and the alkaline earth metal carbonates. Neutral or alkaline carbon blacks are the preferred carbon blacks.

The crosslinkable composition is heat cured for a time sufficient to obtain the desired degree of crosslinking. The heat curing has a temperature-time relationship which is primarily dependent on the polymeric material and the peroxide present but is affected by the formulation as a whole. It is customary to use a time equal to about 6–8 half-lives of the peroxy agent.

It has been discovered that crosslinked polymeric compositions prepared using the tertiary-alkyl halocumyl peroxides of this invention essentially do not develop a bloom on aging and exhibit no residual odor caused by the decomposition of the peroxide.

Embodiments of crosslinkable (vulcanizible) compositions, crosslinked (vulcanized) compositions, and the heat curing thereof are set out in certain of the following examples.

In general, the ingredients of these formulations are milled to an intimate plastic mixture on a standard roll mill, such as used in the rubber industry. The temperature of the mix during milling is held below 250° F. At these conditions no scorching occurs.

The intimately mixed vulcanizible mass is removed from the roll mill and a portion placed in a mold in a hydraulic press and heat cured. The curing times and temperatures are varied depending upon the peroxy crosslinking agent and the polymeric material used.

Immediately upon removal from the curing press, the cured slabs are permitted to mature at room temperature for about 24 hours. This maturing time is sufficient to give reproducible results.

The matured slabs are then cut into dumbbell shaped specimens and tested for tensile strength on an Instron Tensile Tester, following ASTM procedure as prescribed in D412–61T, "Tension Testing of Vulcanized Rubber."

The target for commercial quality cured EPR composition is a 300% modulus of 1500±100 p.s.i.

Various embodiments of this invention are illustrated in the following examples although it is not intended that the invention be limited thereby. Parts and percentages are by weight and temperatures in degrees centigrade unless otherwise indicated.

Example 1.—t-Butyl p-chlorocumyl peroxide p-Chlorocumyl alcohol was prepared by the addition of methyl-magnesium bromide to p-chloroacetophenone. The yield of alcohol was 29%; it boiled at 80–83° C. at 0.06 mm. and melted at 42° C. The low yield was due to partial dehydration of the alcohol during distillation.

A jacketed, open-top reactor was equiped with a paddle stirrer, thermometer and addition funnel. Into the reactor was charged 14.0 g. (0.1 mol) of 70% sulfuric acid and 15 ml. of methylene chloride. The stirred mixture was then cooled to —5° C. by passing iced brine through the reactor jacket. To the cooled mixture was slowly added 13.5 g. (0.15 mol) of 100% t-butyl hydroperoxide. The temperature was not allowed to rise above —5° C. To this mixture was added 17 g. (0.1 mol) of p-chorocumyl alcohol at —5 to —3° C. over a 30 minute period. The reaction mixture was then stirred an additional 5 hours at 0° C. and 3 hours at ambient temperature. The reaction mixture was then washed with 50 ml. portions of 10% aqueous potassium hydroxide solution until it was free of unreacted hydroperoxide, then wtih 50 ml. portions of water until the aqueous phase was no longer alkaline. The organic layer was dried (magnesium sulfate), filtered and stripped in vacuo leaving a colorless organic liquid weighing 24 g. and assaying 97.2% by chlorine analysis and vapor phase chromatography. Yield (corrected for assay) was 96.5%. The refractive index was 1.4856 at 25° C.

This compound was also prepared from p-chloro-α-methylstyrene (B.P. 54–8° at 22 m.; $n_D^{25}$ 1.5536) and t-butyl hydroperoxide in the presence of 14 mole percent of α,p-dichlorocumene. The yield (corrected for assay) was 51%.

These peroxides cannot be assayed by conventional iodometric procedures.

Example 2.—t-Butyl m-chlorocumyl peroxide m-Chlorocumyl alcohol was prepared in 92% yield from methyl-magnesium bromide and m-chloroacetophenone. Physical properties: B.P. 58–65° C. at 0.01 mm.; $n_D^{25}$ 1.5350.

The peroxide was prepared from the alcohol and t-butyl hydroperoxide in a manner analagous to that described in Example 1. The product was a colorless liquid having a refractive index of 1.4886 at 25° C. and assayed 96.4% based on chlorine analysis and vapor phase chromatography. The yield was 88%.

Example 3.—t-Butyl p-fluorocumyl peroxide

A mixture of 18.4 g. (0.175 mol) of 86% t-butyl hydroperoxide, 3.28 g. (0.019 mol) of p-fluorocumyl chloride and 17.85 g. (0.131 mol) of p-fluoro-α-methylstyrene (Baker Chemicals) was stirred at 25° C. for 20 hours. The reaction mixture was diluted with 30 ml. of ether and washed with two 30 ml. portions of 10% potassium hydroxide solution and 100 ml. of 5% sodium chloride solution. The organic layer was added to 200 ml. of water and the mixture distilled at 50–60 mm. of pressure and 60° C. until no further oil came over with the aqueous distillate. The organic residue was separated, dried (magnesium sulfate) and filtered. The residue weighed 24.2 g. and the refractive index was 1.4650 at 22° C. The compound had only a single peak in a vapor phase chromatogram, and assayed 97% (based on fluorine content). The yield (corrected for assay) was 71.5%.

Example 4.—t-Butyl 3,4-dichlorocumyl peroxide 3,4-dichlorocumyl alcohol was prepared in 99% yield from methylmagnesium bromide and 3,4-dichloroacetophenone. The alcohol was not distilled because it was very susceptible to dehydration. It was judged to be free of starting ketone by the absence of a carbonyl absorption in its infrared spectrum.

Into a jacketed, open-top reactor, equipped with mechanical stirrer, therometer and addition funnel was placed 35 g. (0.25 mol) of 70% sulfuric acid and 75 ml. of methylene chloride. The stirred mixture was cooled to —8° and 30 g. (0.33 mol) of 98.3% t-butyl hydroperoxide was added dropwise at such a rate that the temperature did not rise above —5° C. Then 50 g. (0.244 mol) of 3,5-dichlorocumyl alcohol was added over a 40 minute period keeping temperature at —5° C. Mixture was then stirred for 90 minutes at 0 to +5° C. and then for 30 minutes at 5–10° C.

To the reaction mixture was added 50 ml. of ether and 50 ml. of ice water. The acidic aqueous layer was drained off. The organic layer was dried (magnesium sulfate), filtered and stripped in vacuo. The residue weighing 57 g. contained a considerable amount of unreacted alcohol (according to an infrared spectrum). The crude product was again treated with 70% sulfuric acid (35 g.) and t-butyl hydroperoxide (30 g.) as above but was stirred 90 minutes at 0–10° C. and 90 minutes at 10–15° C. and 15 hours at 15–18° C. After the usual work-up, the dried organic solution was stripped in vacuo at 45–50° C. at an ultimate pressure of 0.05 mm. The residue was a yellow oil weighing 27.6 g. and assaying 97.3% (based on chlorine analysis). The yield (corrected for assay) was 41%.

Example 5.—t-Butyl p-bromocumyl peroxide p-Bromocumyl alcohol was prepared in 50% yield from methyl-magnesium bromide and p-bromoacetophenone. The alcohol melted at 36–8° C.

The peroxide was prepared in the manner described in Example 1 from 70% sulfuric acid, 93% t-butyl hydroperoxide and p-bromocumyl alcohol. The product assayed 99.6% (bromine analysis) and its refractive index was 1.5013 at 25° C. The yield (corrected for assay) was 96.3%.

Example 6.—t-Butyl chlorocumyl peroxide

A 100 ml., 3-necked flask was equipped with a thermometer, magnetic stirrer, a Dry Ice-isopropyl alcohol reflux condenser and a gas inlet tube.

Into the flask was charged 20.8 g. (0.1 mol) of t-butyl cumyl peroxide and 25 ml. of carbon tetrachloride. The mixture was stirred at 5° C. while 8.5 g. (0.12 mol) of gaseous chlorine was bubbled in over a 25 minute period. The mixture was stirred at 0° C. for 90 minutes, then the reaction mixture was stripped in vacuo at 0° C. in order to remove unreacted chlorine and hydrogen chloride. The yellow liquid residue was dissolved in 100 ml. of ether and washed with 50 ml. of 10% potassium hydroxide solution and five times with 50 ml. portions of 10% sodium carbonate solution. The organic layer was dried (magnesium sulfate), filtered and stripped in vacuo to give 21.1 g. of a pale yellow oil; $n_D^{25}$ 1.4850 (t-butyl cumyl peroxide, $n_D^{25}$ 1.4767; t-butyl p-chlorocumyl peroxide, $n_D^{25}$ 1.4865; t-butyl m-chlorocumyl peroxide, $n_D^{25}$ 1.4886). The product contained 68% of the theoretical chlorine for a monochloro derivative. A vapor phase chromatographic analysis indicated the presence of t-butyl p-chlorocumyl peroxide along with unreacted t-butyl cumyl peroxide and other chlorinated peroxides.

Example 7.—Half-lives of t-butyl halocumyl peroxides

In Table II are listed the half-lives of selected peroxides. The determinations were carried out on 0.2 molar solutions of the peroxide in benzene. The decomposition was followed, in most cases, by withdrawing samples periodically from a thermostated bath and determining the amount of undecomposed peroxide by vapor phase chromatography. The half-life of t-butyl cumyl peroxide is included for comparison purposes.

perature curing agents for basic polyester resin having the following formulation:

| | |
|---|---|
| Maleic anhydride moles | 1.0 |
| Phthalic anhydride do | 1.0 |
| Propylene glycol do | 2.2 |
| Acid number of alkyd resin | 35–45 |
| Inhibitor (hydroquinone) (percent of final solution) percent | 0.013 |
| Styrene monomer (percent of final solution) do | 30 |

The catalyst concentration was 1% by weight of resin. The standard S.P.I. exotherms were determined at 115° C. and the resulting data are summarized in Table III where it can be seen that the peroxides of this invention are somewhat slower than dicumyl peroxide but are equivalent in all other respects and, significantly, do not leave an unpleasant, persistent odor in the cured resin as dicumyl peroxide does.

TABLE III.—PEROXIDE CURING OF POLYESTER RESIN AT 115° C.

| | Dicumyl peroxide | t-Butyl p-chlorocumyl peroxide | t-Butyl m-chlorocumyl peroxide |
|---|---|---|---|
| Gel time (min.) | 6.5 | 7.6 | 7.8 |
| Cure time (min.) | 7.9 | 9.6 | 9.6 |
| Peak exotherm (° F.) | 445 | 435 | 440 |
| Barcol hardness | 45 | 45 | 45 |

Example 9.—Vulcanization of ethylene-propylene rubber

Selected peroxides were compounded with ethylene-propylene rubber using 10 milliequivalents of peroxide per 100 g. of rubber. Test pieces were vulcanized in a heated platen press at 320°, 340° and 375° F. The tensile properties of the vulcanized rubbers are summarized in Table IV from which it can be seen that the peroxides of this invention are equivalent to dicumyl peroxides, a well-known vulcanization agent; however, the test pieces, vulcanized with the peroxides of this invention did not have the objectionable odor of acetophenone which was present in the test pieces vulcanized with dicumyl peroxide.

TABLE IV.—VULCANIZATION OF ETHYLENE-PROPYLENE RUBBER[1]

| Cure temp., ° F. | Dicumyl peroxide (tech.) | | | t-Butyl-p-fluorocumyl peroxide | | | t-Butyl-3,4-dichloro cumyl peroxide | | |
|---|---|---|---|---|---|---|---|---|---|
| | 300% M | U.T.S., lbs./sq. in. | Percent E | 300% M | U.T.S., lbs./sq. in. | Percent E | 300% M | U.T.S., lbs./sq. in. | Percent E |
| 320 | 1,314 | 2,071 | 444 | 1,124 | 2,109 | 515 | 1,108 | 2,078 | 534 |
| 340 | 1,206 | 2,101 | 475 | 1,454 | 2,140 | 425 | 1,600 | 2,091 | 388 |
| 375 | 945 | 1,935 | 518 | 1,006 | 2,070 | 519 | 1,192 | 1,956 | 438 |

[1] The formulation of the ethylene-propylene rubber used is EPR: 404:

```
40:60 ethylene:propylene content; no oil extender; made by Enjay Chemi-
    cal Co. _____ 100
SRF carbon black _____ 60
Sulfur _____ 0.3
```

NOTE.—M=modulus; U.T.S.= ultimate tensile strength; E=elongation.

TABLE II

Half-lives of peroxides in benzene at 115° C. in hours

| | |
|---|---|
| t-Butyl cumyl peroxide | 17.2 |
| t-Butyl p-chlorocumyl peroxide | 20.2 |
| t-Butyl m-chlorocumyl peroxide | 18.0 |
| t-Butyl 3,4-dichlorocumyl peroxide | 19.3 |
| t-Butyl p-fluorocumyl peroxide | 18.3 |
| t-Butyl p-bromocumyl peroxide | 18.8 |

As can be seen in Table II the presence of the aromatic halogen seems to slightly raise the thermal stability of the non-halogenated peroxide.

Example 8.—Curing of polyester resin

The halogenated peroxides were evaluated as high-tem-

Example 10.—Crosslinking of polyethylene

The peroxide (usually 0.01 equivalent of peroxide per 100 g. of polyethylene) was milled into DYNH-1, a grade of low-density polyethylene, on a two-roll mill. The milled sheet was cut into plaques and cured in a platen press at a ram pressure of 20,000 p.s.i. for 30 minutes at the temperature specified. The percentage of crosslinking was determined by extracting the uncrosslinked portion with xylene at 80° C.

The data for selected peroxides are shown in Table V. Data for t-butyl cumyl peroxide and for t-butyl p-alkylcumyl peroxides are shown for comparison purposes. It can be seen that the peroxides of this invention are superior to t-butyl cumyl peroxide and also to t-butyl alkyl-cumyl peroxides of similar molecular weight. In addition, there is no unpleasant odor from peroxide decomposition products as there is with t-butyl cumyl peroxide or dicumyl peroxide.

TABLE V.—CROSSLINKING OF POLYETHYLENE [1]

| Cure temp., °F | Percent crosslinked | | |
|---|---|---|---|
| | 320 | 340 | 375 |
| Peroxide: | | | |
| t-Butyl cumyl peroxide | 82.0 | 85.0 | 84.8 |
| t-Butyl p-methylcumyl peroxide | 79.1 | 81.3 | 80.3 |
| t-Butyl p-isopropylcumyl peroxide | 81.4 | 82.2 | 81.4 |
| t-Butyl p-chlorocumyl peroxide | 85.1 | 88.4 | 87.5 |
| t-Butyl m-chlorocumyl peroxide | 84.2 | 87.8 | 86.9 |
| t-Butyl 3,4-dichlorocumyl peroxide | 84.2 | 87.8 | 88.5 |
| Dicumyl peroxide | 90.5 | 89.9 | 89.0 |

[1] The polyethylene was Bakelite DYNH-1 made by Unon Carbide Plastics Division. The polyethylene charge had zero cross-linking.

Although the invention has been described in considerable detail with reference to certain preferred embodiments thereof, it is to be understood that variations and modifications can be effected within the spirit and scope of the invention as described hereinabove and as defined in the appended claims.

What is claimed is:

1. A tertiary-alkyl halocumyl peroxide of the formula:

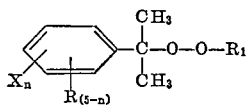

wherein X is fluorine, chlorine or bromine; R is hydrogen or an alkyl, cycloalkyl or aryl radical having up to about 10 carbons; $R_1$ is a tertiary-alkyl radical of 4–8 carbon atoms; and $n$ is an integer from 1 to 5.

2. A peroxide of claim 1 wherein R is hydrogen.
3. A peroxide of claim 1 wherein $R_1$ is tertiary-butyl or tertiary-amyl.
4. A peroxide of claim 1 of the formula

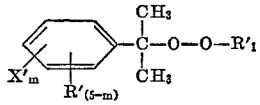

wherein X is fluorine, chlorine, or bromine; R' is hydrogen or a lower alkyl of 1–4 carbon atoms; $R'_1$ is tertiary-butyl or tertiary-amyl; and $m$ is an integer from 1 to 3.

5. As a peroxide of claim 4 t-butyl p-chlorocumyl peroxide.
6. A peroxide of claim 4 wherein $R'_1$ is tertiary-butyl and $m$ is 1 or 2.
7. A peroxide of claim 6 where R' is hydrogen.
8. A peroxide of claim 7 where $m$ is 1.

References Cited

UNITED STATES PATENTS

| 2,501,966 | 3/1950 | Rust et al. | 260—610 R |
| 2,501,967 | 3/1950 | Vaughan et al. | 260—610 R |
| 2,819,255 | 1/1958 | Boardnan | 260—85.1 |
| 3,169,103 | 2/1965 | Falcone et al. | 204—158 |
| 3,267,066 | 8/1966 | Tijssen | 260—610 R |
| 3,505,363 | 4/1970 | Milas | 260—610 R |
| 2,908,668 | 10/1959 | Reynolds et al. | 260—84.1 |

FOREIGN PATENTS

| 954,361 | 4/1964 | Great Britain | 260—610 R |
| 961,481 | 6/1964 | Great Britain | 260—610 R |
| 961,481 | 7/1962 | Great Britain | 260—610 |

OTHER REFERENCES

Reynolds, "Chem. Abs.," vol. 54 (1960), p. 1914.

BERNARD HELFIN, Primary Examiner

W. B. LONE, Assistant Examiner

U.S. Cl. X.R.

260—80 C